United States Patent
McKee et al.

(10) Patent No.: US 12,429,999 B2
(45) Date of Patent: *Sep. 30, 2025

(54) MOBILE VIEWER OBJECT STATUSING

(71) Applicant: Procore Technologies, Inc., Carpinteria, CA (US)

(72) Inventors: Kevin McKee, Del Mar, CA (US); David McCool, Carpinteria, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/492,768

(22) Filed: Oct. 23, 2023

(65) Prior Publication Data
US 2024/0053860 A1 Feb. 15, 2024

Related U.S. Application Data

(63) Continuation of application No. 17/348,163, filed on Jun. 15, 2021, now Pat. No. 11,797,147.

(51) Int. Cl.
*G06F 3/04815* (2022.01)
*G06F 3/04847* (2022.01)
(Continued)

(52) U.S. Cl.
CPC ...... *G06F 3/04815* (2013.01); *G06F 3/04847* (2013.01); *G06F 30/12* (2020.01); *G06F 30/13* (2020.01); *G06T 19/00* (2013.01)

(58) Field of Classification Search
None
See application file for complete search history.

(56) References Cited

U.S. PATENT DOCUMENTS 6,247,131 B1   6/2001  Kotani et al.
6,718,218 B1 *  4/2004  Matheson ............... G06F 30/00
                                                700/118
(Continued)

OTHER PUBLICATIONS

International Searching Authority, PCT International Search Report and Written Opinion, PCT International Application No. PCT/US2022/033504 dated Oct. 11, 2022, 9 pages.
(Continued)

*Primary Examiner* — Linda Huynh
(74) *Attorney, Agent, or Firm* — Lee Sullivan Shea & Smith LLP

(57) ABSTRACT

An example client device is configured to (i) display a representation of a three-dimensional, federated model of a construction project, the model including respective objects created using at least two different authoring tools, (ii) receive one or more user inputs that collectively (a) select a displayed representation of a given object within the model and (b) assign a value for a property of the given object, (iii) based on the one or more user inputs, identify a globally unique identifier (GUID) that uniquely identifies the given object within a hierarchical data structure for the model and cause the model to be updated by associating the assigned value for the property with the GUID that uniquely identifies the given object, and (iv) display a representation of the updated model including an indication of the assigned value for the property of the given object.

20 Claims, 14 Drawing Sheets
(8 of 14 Drawing Sheet(s) Filed in Color)

(51) Int. Cl.
    *G06F 30/12*     (2020.01)
    *G06F 30/13*     (2020.01)
    *G06T 19/00*     (2011.01)

(56) References Cited

U.S. PATENT DOCUMENTS

| | | |
|---|---|---|
| 2003/0174140 A1 | 9/2003 | Shima |
| 2003/0177187 A1* | 9/2003 | Levine .................... A63F 13/10 709/205 |
| 2008/0015823 A1 | 1/2008 | Arnold et al. |
| 2008/0234991 A1 | 9/2008 | Axling et al. |
| 2009/0070073 A1* | 3/2009 | Wood .................... G06Q 10/06 703/1 |
| 2009/0144654 A1* | 6/2009 | Brouwer ................ G06Q 30/02 715/802 |
| 2012/0065946 A1 | 3/2012 | Brown et al. |
| 2012/0296610 A1 | 11/2012 | Hailemariam et al. |
| 2014/0129912 A1 | 5/2014 | Kannala et al. |
| 2015/0379063 A1 | 12/2015 | Sohn et al. |
| 2018/0218540 A1 | 8/2018 | Sridharan et al. |
| 2020/0151287 A1 | 5/2020 | McCool et al. |
| 2020/0151954 A1 | 5/2020 | McCool et al. |
| 2021/0118228 A1 | 4/2021 | McCool et al. |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

EP Extended Search Report, European Application No. 22825709.3, dated Feb. 27, 2025, 10 pages.

Petri, Ioan et al., "Coordinating Multi-Site Construction Projects Using Federated Clouds", Automation in Construction, vol. 83, Aug. 23, 2017, pp. 273-284.

Dalux: "Dalux BIM Viewer", Retrieved from Internet: URL:https://www.youtube.com/watch?v=idk3D_rxF9c, Jan. 15, 2017, 2 pages.

Dalux: "Public Markups on Drawings | Dalux Box", Retrieved from Internet: URL:https://www.youtube.com/watch?v=fkgvpTRa24M, Apr. 24, 2019, 2 pages.

* cited by examiner

Create Custom Field

Object Property *
Installation Status — 411

Property Type *
Multi Select (Pick List) — 412

Options *

| Name | Active | Color |
|---|---|---|
| No Status | ☒ | ○ | — 413a
| Excavated | ☒ | ● | — 413b
| Formwork Complete | ☒ | ● | — 413c
| Rebar In Place | ☒ | ● | — 413d
| Concrete Poured | ☒ | ● | — 413e \* Required Cancel  [Create]

MOBILE VIEWER OBJECT STATUSING

CROSS-REFERENCE TO RELATED APPLICATIONS

This application claims priority to U.S. application Ser. No. 17/348,163, filed Jun. 15, 2021, and entitled "Mobile Viewer Object Statusing," the contents of which are herein incorporated by reference in their entirety.

BACKGROUND

Software applications are used on a regular basis to perform and manage tasks in users' personal and professional capacities. As some examples, software applications may assist users with managing tasks related to email communications, customer relationship management, billing and payroll processing, human resources management, and construction project design and management. Many other types of software applications exist.

Software applications handle a large volume of information and can be complex. It is therefore desirable for software applications to provide sophisticated features and tools which can enhance a user's ability to interact with the software application, obtain desired information, and improve the overall user experience. Thus, any tool that can improve a user's interaction with a software application is desired.

OVERVIEW

A construction project often involves the creation of project-specific architectural plans, engineering plans, shop drawings, and/or other types of drawings, etc. These various different plans and drawings generally include visual representations of the construction project that communicate information about the project, such as how to assemble or construct different parts of the project. Such visual representations tend to take one of at least two different forms. One form may be a two-dimensional technical drawing in which two-dimensional line segments of the drawing represent certain physical elements of the construction project like walls and ducts. In this respect, a two-dimensional technical drawing could be embodied either in paper form or in a computerized form, such as an image file (e.g., a PDF, JPEG, etc.), or via software for creating and/or viewing a two-dimensional drawing model.

As another possibility, a construction project's design plans and drawings may be represented by a three-dimensional model that is embodied in a computerized form, such as in a building information model (BIM) file, with three-dimensional meshes visually representing the physical elements of the construction project (e.g., walls, ducts, etc.). Specialized software is configured to edit and access the BIM file and/or render a three-dimensional view of the construction project from one or more perspectives. This provides some advantages over two-dimensional technical drawings, namely that a construction professional may obtain a more complete overview of the construction project based on a single three-dimensional view and thus may not have to shuffle through multiple two-dimensional drawings in order to conceptualize what a given portion the construction project looks like.

In many cases, a three-dimensional model representing an entire construction project is made up of several smaller three-dimensional models that are individually created by the many stakeholders involved in the planning, design, and construction of the project. For instance, an architect may prepare a three-dimensional model representing a building's design plans, one or more engineers may prepare three-dimensional models representing the building's mechanical, electrical, and/or plumbing design, and one or more contractors or material suppliers may prepare three-dimensional shop drawings representing more specific details of certain components of the project. Further, each of the stakeholders noted above may use a different authoring tool for creating their respective three-dimensional model. Each of these initially separate three-dimensional models may be combined (e.g., using a common coordinate system, by importing one into another, etc.) to create the overall three-dimensional model for the construction project, which is sometimes referred to as a federated model.

While many stakeholders may be involved in creating the three-dimensional models that make up such a federated model, numerous additional stakeholders may utilize the federated model during the course of the construction project, particularly during the construction phase. For instance, various contractors, sub-contractors, and the like may access the federated model during construction using specialized software to navigate through the model and focus on objects of interest, such as the building's foundation or a particular wall or duct. Because contractors and sub-contractors frequently interact with the model in this way while in the field, current software solutions generally involve specialized mobile applications designed for viewing the model on mobile devices.

However, there are some shortcomings associated with current solutions for accessing the model while in the field. As one example, productivity in the construction field is increasingly being driven by software-based solutions for managing information associated with a given construction project. But these solutions remain relatively fragmented, such that a given stakeholder might need to interact with numerous different productivity applications to accomplish a set of tasks. For instance, a given contractor may interact with one software application for tracking the installation status of objects in the field, another application for managing the supply chain for delivery of materials to the job site, another application for scheduling, another for generating cost estimates, another for processing invoices, and so on. Consequently, there is a great deal of app fatigue within the industry and having to access yet another application to reference the model when performing one or more of the tasks above only adds to the fatigue.

As another example, specialized mobile applications designed for viewing the model generally do not provide viewers of the model with the capability of editing objects (e.g., editing the properties of objects) within the model. However, there may be situations where this is desirable. For instance, a contractor may want to update a piece of equipment within the model by adding a flag and/or updating a status property indicating that the piece of equipment has been delivered to the job site, or that the piece of equipment has been installed. Often, the most convenient place and time for the contractor to make these types of updates is in the field, when the piece of equipment is delivered and then installed. Yet current mobile solutions do not provide a convenient way to accomplish this. Instead, the contractor has to remember or otherwise make note of which objects in the model need to be updated and the respective statuses of each, and then input these once the contractor has returned to a field office where access to an editable version for the model is provided (e.g., via a desktop software application). Consequently, there is some risk of information loss between the time an object is delivered, installed, etc. in the field and the time this status information can be added to the model.

To address these and other problems with existing technology that is used for interacting with a three-dimensional model of a construction project, disclosed herein is new software technology that provides for an improved mobile viewing tool for a three-dimensional model that can be embedded in another application. For example, a user may access the viewing tool as a plug-in to an invoicing application used for generating and processing invoices for work performed on the project. Further, the viewing tool discussed herein may enable a user to define a custom property for an object and a set of a values that may be assigned to objects within the model. For instance, the set of values may correspond to the status of an object within the construction project (e.g., delivery to the construction site, installation status, percentage complete, etc.). Thereafter, the user may select an object within the embedded viewing tool and assign one of the custom values to the object. This information may be transmitted to a back-end platform that may cause the three-dimensional model to be updated to reflect the status of the object.

However, there are various challenges associated with this approach due to the federated nature of the three-dimensional model for the construction project. In particular, for the assigned values that are associated with objects in the model to persist across different versions of the model, the back-end computing platform must associate the values with an object identifier within the hierarchical data structure for the model that will not change as the model is updated and newer versions of the model are published.

Once such object identifier is a globally unique identifier (GUID) that is assigned to each object within the model. However, the GUID for a given object might be located in one of numerous different locations (e.g., saved in one of numerous different data nodes) within the hierarchical data structure for the model, depending on several factors. For instance, each different authoring tool (e.g., Revit®, AutoCAD®, SolidWorks®, etc.) that is used by a construction professional to create one of the component models that are combined to form the overall federated model for the construction project may follow a different convention for organizing data structures for a given object. Consequently, the GUID for any given object, such as a wall, may be found in one location of the federated model's data structure if the object was created using a first authoring tool, but may be found in a different location of the federated model's data structure if the object was created using a second authoring tool. Additionally, within a given authoring tool, the GUID for a given object may be located in one of multiple different locations based on the type of object in question.

Therefore, in order to identify the GUID of a given object that is to be updated in the model, the back-end computing platform may first identify the authoring tool that was used to create the object. Based on the authoring tool that was used, the back-end computing platform may locate the GUID for the given object within the hierarchical data structure for the model and then associate the updated information with the object's GUID.

This increased ability for a construction professional to update the federated model with the status of objects while in the field at the time of delivery, installation, inspection, etc. may provide numerous benefits related to the accessibility and delivery of information for the construction project. As one example, a construction professional may update an object's delivery or installation status via the disclosed mobile viewing tool in real-time, or near real-time, while working in the field, which may reduce the risk of information loss. As another example, a stakeholder that is seeking current status information about a particular object or set of objects in the construction project may be able to easily review such information via a mobile viewing tool that is embedded within another application that the stakeholder is already using. As yet another example, the back-end computing platform may utilize the updated status information within the model to power analytics (e.g., predictive analytics) and automate other operations that may be based on the status information, such as invoicing, scheduling, and the like. Other examples are also possible.

In line with the discussion above, the disclosed technology may be implemented as one or more software applications that facilitate interacting with a three-dimensional model of a construction project, some examples of which may include the types of software applications developed by Procore Technologies. Further, in practice, the computing platform in which the disclosed technology is incorporated may take the form of a software as a service ("SaaS") application that comprises a front-end software component running on a user's client station and a back-end software component running on a back-end computing platform that is accessible to the user client station via a communication network such as the Internet.

Accordingly, in one aspect, disclosed herein is a method that involves a computing platform (i) maintain a three-dimensional, federated model of a construction project, wherein the model comprises respective objects created using at least two different authoring tools, (ii) receive, via a client device installed with a viewing tool for displaying the model, one or more user inputs that collectively (a) select a displayed representation of a given object within the model and (b) assign a value for a property of the given object, (iii) based on the one or more inputs, (a) identify a globally unique identifier (GUID) of the given object within a hierarchical data structure for the model, and (b) cause the model to be updated by associating the assigned value for the property with the GUID of the given object, and (iv) cause the client device to display the updated model comprising an indication of the assigned value for the property of the given object In some example embodiments, the client device may be a mobile device and the viewing tool for displaying the model may be a plug-in configured to operate as a component of another application installed on the mobile device.

Further, in example embodiments, the one or more user inputs may include one or more second user inputs, and the method may further involve (i) providing, via the viewing tool for displaying the model, an interface for receiving one or more first user inputs that define (a) the one or more properties of the given object and (b) a respective set of possible values for each of the one or more properties, and (ii) before receiving the one or more second user inputs, receive one or more first user inputs that define (a) the property of the given object and (b) a set of possible values for the property, where the set of possible values includes the assigned value.

Further yet, in some example embodiments, defining the respective set of possible values for each of the one or more properties may include designating a respective display color corresponding to each value in a respective set of values, and where causing the client device to display the updated model includes displaying the updated model such that the given object is displayed in the designated display color corresponding to the assigned value.

Still further, in some example embodiments, identifying the GUID may include (i) identifying an authoring tool that was used to create the given object in the model, and (ii) based on the identified authoring tool, determining a location within the hierarchical data structure where the GUID is saved.

Still further, in some example embodiments, the method may further include (i) before receiving the one or more user inputs via the client device, determining that the client device is associated with a user profile that is authorized to assign a value to the property of the given object in the model, and (ii) based on determining that the client device is associated with the authorized user profile, enabling the client device to access an input tool for assigning the value for the property of the given object.

Still further, in some example embodiments, the property of the given object may reflect an installation status of construction materials corresponding to the given object in the model.

Still further, in some example embodiments, the method may further include, based on the assigned value for the property of the given object indicating the installation status, generating an invoice corresponding to the installation the construction materials.

In another aspect, disclosed herein is a computing platform that includes a network interface, at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable storage medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4B depicts an example user interface for defining a property for an object in the three-dimensional model and a set of possible values for the property.

FIG. 6 depicts an example tool that has been automatically populated with the status information shown in FIG. 4G.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

As one possible implementation, this software technology may include both front-end client software running on one or more client stations that are accessible to client users of the software technology and back-end software running on a back-end platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end platform (e.g., a native software application). The software technology disclosed herein may take other forms as well.

Figure 1:
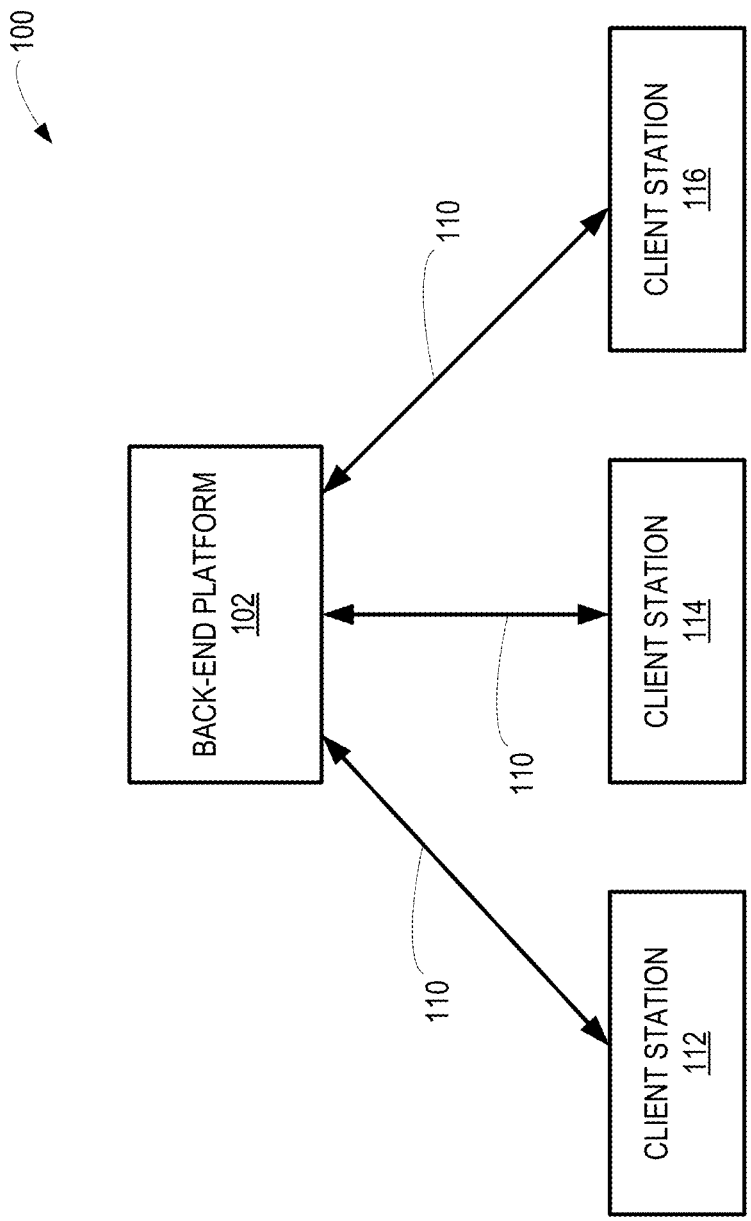
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as three client stations 112, 114, and 116.

In general, back-end computing platform 102 may comprise one or more computing systems that have been provisioned with software for carrying out one or more of the computing platform functions disclosed herein, including but not limited to functions related to outputting associated data and/or instructions that define the visual appearance of a front-end interface (e.g., a graphical user interface (GUI)) through which the data is to be presented on the one or more client stations. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the computing platform functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the computing platform functions disclosed herein. Other implementations of back-end computing platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end computing platform 102 is configured to communicate with one or more client stations 112, 114, 116 over respective communication paths. Each communication path between back-end computing platform 102 and one of client stations 112, 114, 116 may generally comprise one or more communication networks and/or communications links, which may take any of various forms. For instance, each respective communication path with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end computing platform 102 may be wireless, wired, or some combination thereof, and may carry data according to any of various different communication protocols. Although not shown, the respective communication paths with back-end computing platform 102 may also include one or more intermediate systems. For example, it is possible that back-end computing platform 102 may communicate with a given client station 112, 114, 116 via one or more intermediary systems, such as a host server (not shown). Many other configurations are also possible.

Although not shown in FIG. 1, back-end computing platform 102 may also be configured to receive data from one or more external data sources that may be used to facilitate functions related to the disclosed process. For example, the back-end computing platform 102 may be configured to ingest data assets from external data sources and determine location-based associations for them, similar to data assets that are generated by the front-end client stations 112, 114, 116.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
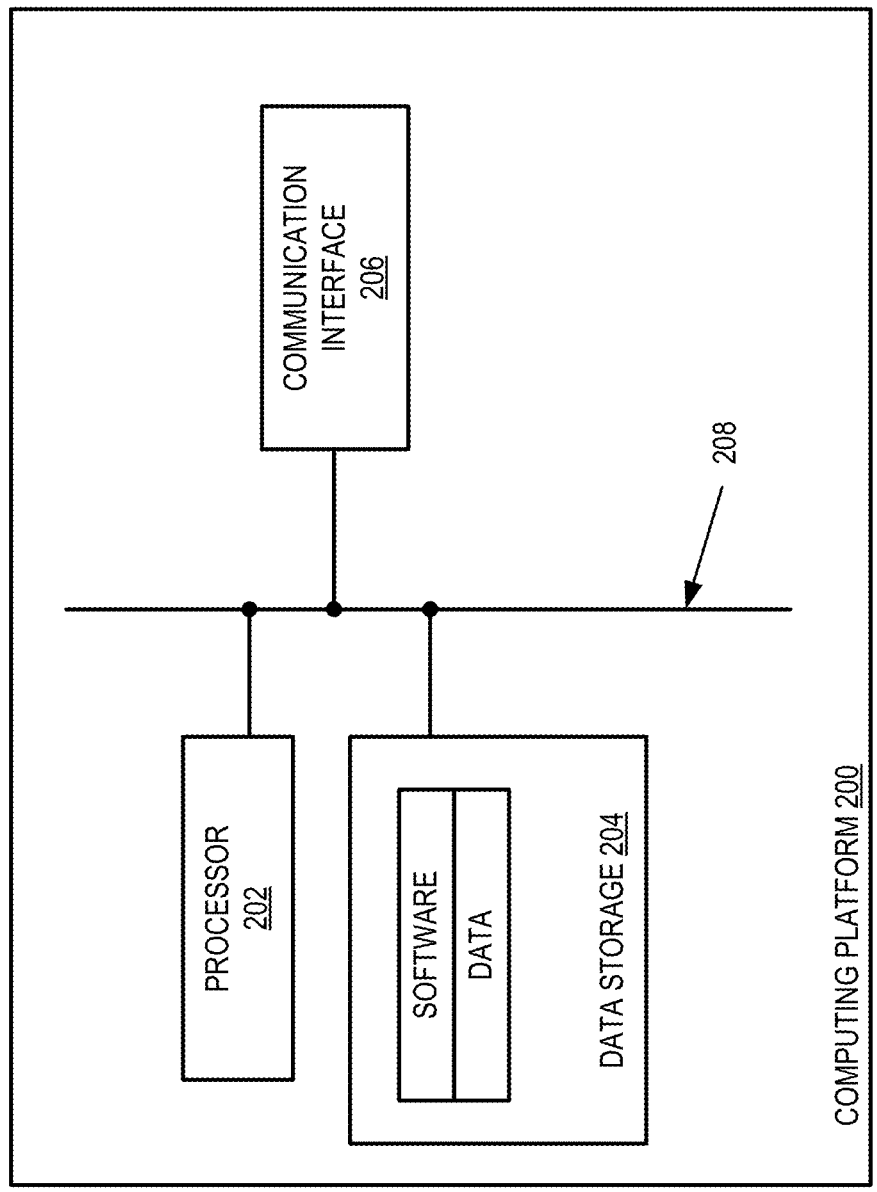
FIG. 2 depicts an example computing platform that may be configured to carry out one or more of the functions of the present disclosure.

FIG. 2 is a simplified block diagram illustrating some structural components that may be included in an example computing platform 200, which could serve as back-end computing platform 102 of FIG. 1. In line with the discussion above, computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing platform 200 is configured to perform some or all of the disclosed functions and (ii) data that may be received, derived, or otherwise stored, for example, in one or more databases, file systems, or the like, by computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where computing platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication, among other possibilities. Communication interface 206 may also include multiple communication interfaces of different types. Other configurations are possible as well.

Although not shown, computing platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing platform 200.

It should be understood that computing platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE FUNCTIONALITY

As described above, the disclosed technology is generally directed to a new software technology that provides for an improved mobile viewer for a three-dimensional model that can be embedded in another application, and which enables a user to create a customized set of a values that may be assigned to objects within the model. This software technology may enable construction professionals in the field to update the status of objects within the three-dimensional model quickly and easily, improving the timeliness and accuracy of information for the construction project.

Figure 3:
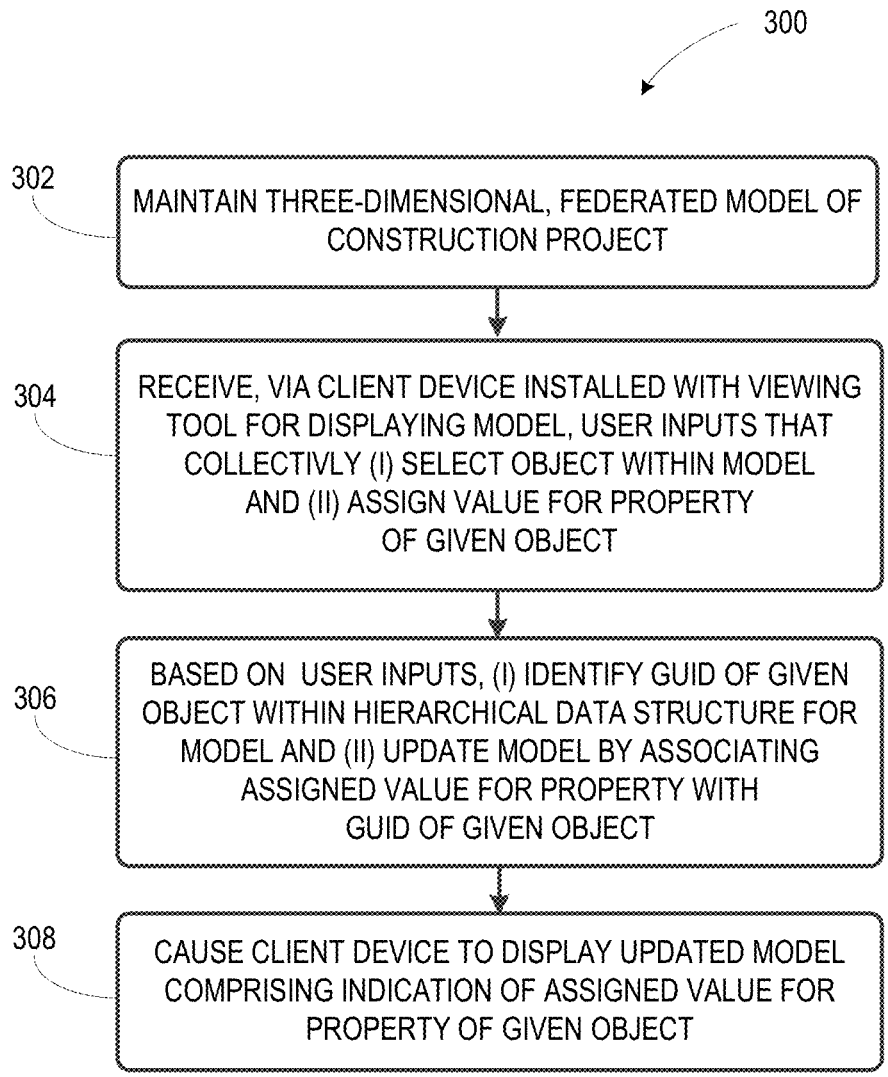
FIG. 3 depicts an example flow chart that may be carried out to facilitate statusing objects in a three-dimensional model via a mobile viewing tool.

Turning to FIG. 3, a flow chart 300 is shown that includes example operations that may be carried out to facilitate statusing objects with a three-dimensional model via a mobile viewing tool. The example operations in flow chart 300 will be discussed with reference to FIGS. 4A-5C and may be carried out by an example computing platform, such as the back-end computing platform 102 of FIG. 1 and/or the computing platform 200 of FIG. 2. For purposes of explanation, the examples that follow will refer to the computing platform 200 as carrying out the operations of the flow chart 300, although numerous other possibilities exist.

At block 302, the computing platform 200 may maintain a three-dimensional, federated model for a construction project. As discussed above, the federated model may be a composite of several different three-dimensional models that are prepared by different designers of the construction project and then merged into a single federated model. Moreover, each of these different stakeholders may use a different three-dimensional model authoring tool to create their respective portion of the federated model. For example, a project architect might use a first authoring tool (e.g., Revit®), a project engineer may use a second authoring tool (e.g., AutoCAD®), and an equipment supplier may use a third authoring tool (e.g., SolidWorks®) to prepare their respective portions of the project. Still further, one or more of the construction project's stakeholders may share three-dimensional model information in the Industry Foundation Classes (IFC) data format. Various other authoring tools and corresponding file formats are also possible.

In some implementations, the computing platform 200 may combine all of these component models by aligning them to a common coordinate system and merging the object data within each component model into a hierarchical data structure for the federated three-dimensional model. For instance, the object data within each component model may include geometry data for each of the three-dimensional meshes (e.g., walls, pipes, etc.) created using the respective authoring tool, object property data relating to each respective mesh (e.g., object type, material, etc.), as well as other meta-data relating to each mesh. The hierarchical data structure for the federated model will be discussed in further detail below with respect to FIGS. 5A-5C.

In some other implementations, the computing platform 200 might not merge the component models into the combined, federated model. Rather, the component models may be combined, in whole or in part, by one or more other computing systems before the full, federated model is provided to the computing platform 200. In either case, the federated three-dimensional model may ultimately be maintained (e.g., stored in memory) by the computing platform 200. Thereafter, one or more client devices, such as the client devices 112 shown in FIG. 1, may access the federated model using specialized front-end software, as discussed herein.

Figure 4A:
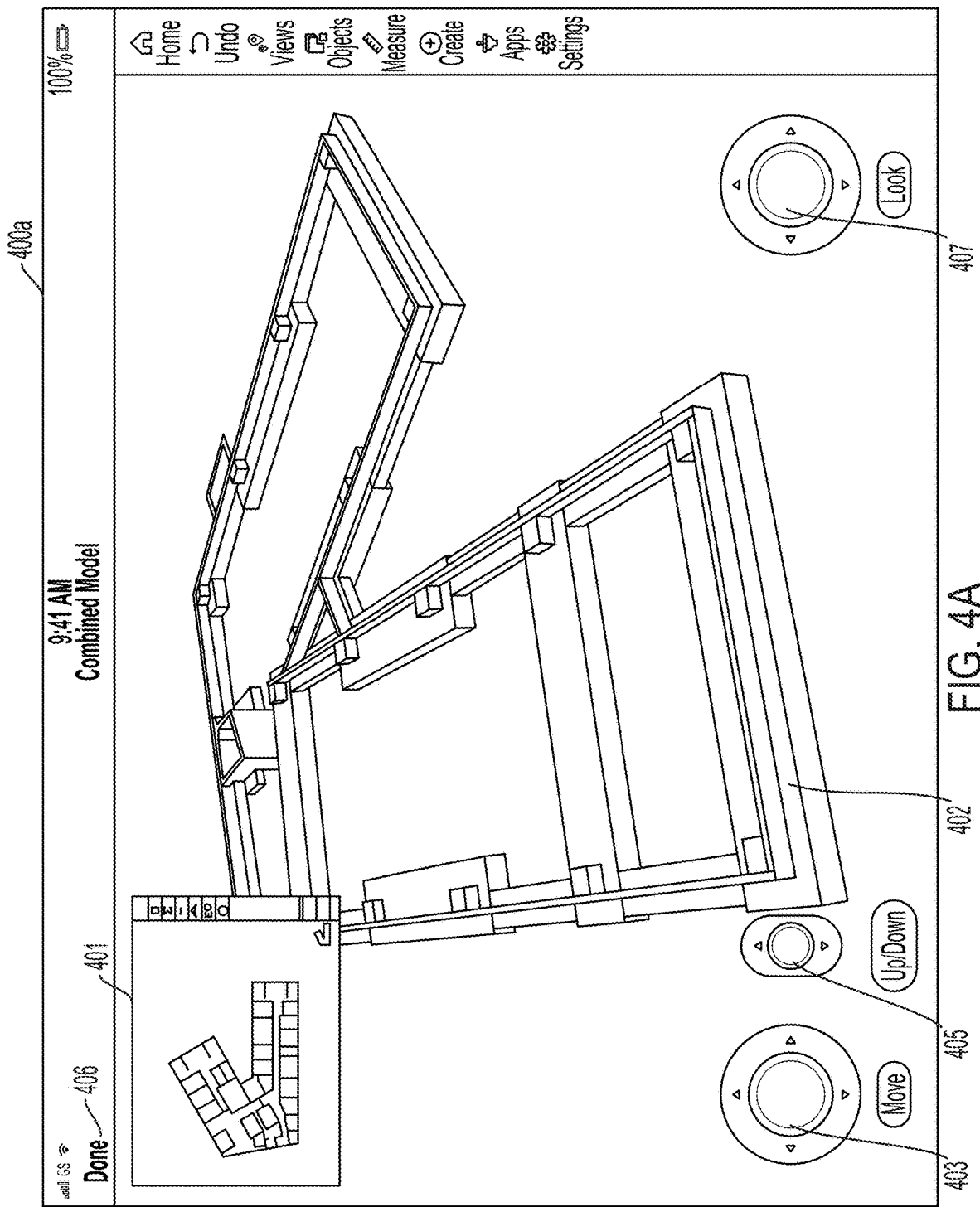
FIG. 4A depicts a three-dimensional model displayed by an example mobile viewing tool operating on a client station.

To illustrate one example of a client station 112 accessing the federated model maintained by the computing platform 200, FIG. 4A depicts an example snapshot 400a of a graphical user interface (GUI) that includes a three-dimensional view of a construction project rendered from a particular perspective. The snapshot 400a may be generated by, for instance, a software tool running on a client station 112 accessing the federated model and then rendering a three-dimensional view of the construction project based on the federated model and presenting it via a display interface of the client station 112. Alternatively, the computing platform 200 may receive a request from the client station to generate a set of instructions for rendering the three-dimensional view of the construction project based on the federated model. The computing platform 200 may then send the instructions to the client station 112, which in turn may present the three-dimensional view of the construction project via the display interface of the client station based on the instructions. Still other arrangements are possible.

As depicted, snapshot 400a includes a three-dimensional view of the construction project from a particular perspective, as well as a smaller, inset view 401 that depicts a top-down, plan view of the construction project, which in this example consists of a building. The three-dimensional view depicted in FIG. 4 includes a number of meshes that represent individual physical objects of the construction project. In particular, FIG. 4A depicts a view of the building's foundation design including a series of meshes 402 that represent concrete footings, as well as meshes 404 that represent structural steel columns. Of course, various other examples including other views and meshes are also possible.

The client station 112 displaying snapshot 400a may be configured to adjust the perspective from which the three-dimensional view is presented in response to, for instance, receiving user inputs at the client station 112. The client station 112 may enable such inputs in various ways. As one possibility, the GUI may include a control 403 that may be used to reposition the perspective either forward or backward (along an x-axis) or side to side (along a y-axis) of the model. Similarly, the client station 112 may reposition the perspective either up or down (along a z-axis) of the model in response to a user manipulating control 405. As another example, the client station 112 may reposition the orientation of the perspective (i.e., the "camera" angle) in response to a user manipulating control 407. Other types of controls and inputs for manipulating the three-dimensional view of the federated model are also possible.

In some examples, the client station 112 may take the form of a mobile device, such as a smartphone or tablet, that a construction professional may utilize while working in the field to quickly and easily access and update project information during the construction phase. In this regard, the mobile client station 112 may include numerous installed applications for managing different aspects of the construction project for which the construction professional is responsible, as noted above. Accordingly, in order to reduce the number of different applications that the construction professional needs to install and switch between to accomplish a given task, the mobile viewing tool for displaying the GUI shown in FIG. 4A may be embedded as a tool within one or more other applications. For example, the mobile viewing tool may be distributed by way of a software development kit (SDK) that allows the mobile viewing tool to be implemented as a plug-in within one or more other applications.

As one possible implementation as a plug-in, the mobile viewing tool may be presented as a GUI that overlays the host application when selected, as shown in the example of FIG. 4A. When the user of client station 112 is done interacting with the model and wishes to return to the host application, the control 406 may be selected to close the plug-in. As another possibility, the mobile viewing tool may be presented as a sub-window that is overlaid on a portion of the host application, such that the user can view and interact with both the host application and the mobile viewing tool simultaneously. Various other implementations are also possible.

As noted above, there may be situations in which it is useful for a construction professional working in the field to quickly and easily update the status of objects within the federated model. Accordingly, the mobile viewing tool discussed herein may provide a configurable interface for defining one or more properties of a given object within the model, as well as a respective set of possible values that may be selected (e.g., from a drop-down menu) and then assigned to the object for each of the one or more properties.

One example of such an interface is shown in FIG. 4B, which depicts an interface 410 that may be accessed from a settings menu or similar area of the mobile viewing tool. As shown in the interface 410, the construction professional has defined a custom object property 411 named "Installation Status." Further, the construction professional has selected "Pick List" as the property type 412, which dictates how the set of values that may be assigned is presented to a user. Still further, the construction professional has defined the set of values 413a-413e that may be selected for the installation status. As shown in FIG. 4B, the set of values defined by the construction professional corresponds to the specific installation status of the building foundation, as generally depicted in FIG. 4A. In particular, the construction professional may be a sub-contractor responsible for concrete installation, and thus the set of values correspond to the various stages of preparing and pouring a concrete foundation, including "No Status" (which may be selected by default), "Excavated," "Formwork Done," "Rebar in Place," and "Concrete Poured." Still further, the interface 410 may allow the construction professional to select a respective display color for each value in the set of values, which may be reflected in the mobile viewing tool when a user opts to view the installation status of objects within the federated model, as defined by the construction professional.

It will be appreciated from the example shown in FIG. 4B that numerous other properties may be defined, including properties of different types and with different corresponding sets of values. For instance, rather than the example pick list shown in FIG. 4B, a set of values might be presented as a drop-down menu, or perhaps a range of values on a slider or similar control that a user may manipulate to select a particular value. Additionally, or alternatively, a user may be prompted to indicate a percentage of completion for a given object's installation, either on a slider or by entering a numerical value, among other possibilities. Further, the same sub-contractor may define a different object property named "Schedule" relating to the timing of delivery and/or installation of a given object, with a corresponding set of values that may be assigned to an object to track whether the object is ahead of schedule, on schedule, or behind schedule (and perhaps how far behind schedule). Still further, a different sub-contractor responsible for installing a building's HVAC system may define an object property called "Installation Status" similar to that shown in FIG. 4B, but with a different set of selectable values that correspond to the various stages of installing HVAC equipment. Numerous other examples are possible.

Once defined, each object property and its corresponding set of values may be available to users as an individual statusing tool within the mobile viewing tool. Further, because of the various different needs of construction professionals to track the status of objects during a construction project, the interface 410 may be highly-configurable to create a wide range of statusing tools, such as those discussed above. Consequently, the statusing tools that are available to a given user may be determined based on a user profile or similar identifying information that is associated with the user's client station 112. For example, the construction professional noted above that creates the statusing tool for the installation status of the building's foundation may designate that the tool be accessible to users within the construction professional's organization, trade, or who are otherwise related to the foundation installation process. Further, the construction professional might designate that users with a higher level of access (e.g., permissions) may be able to use the statusing tool for updating the status of certain objects, whereas users with a lower level of access, or users outside the construction professional's organization, may only be able to use the statusing tool to view a visual representation of the installation status for the objects within the model.

Figure 4C:
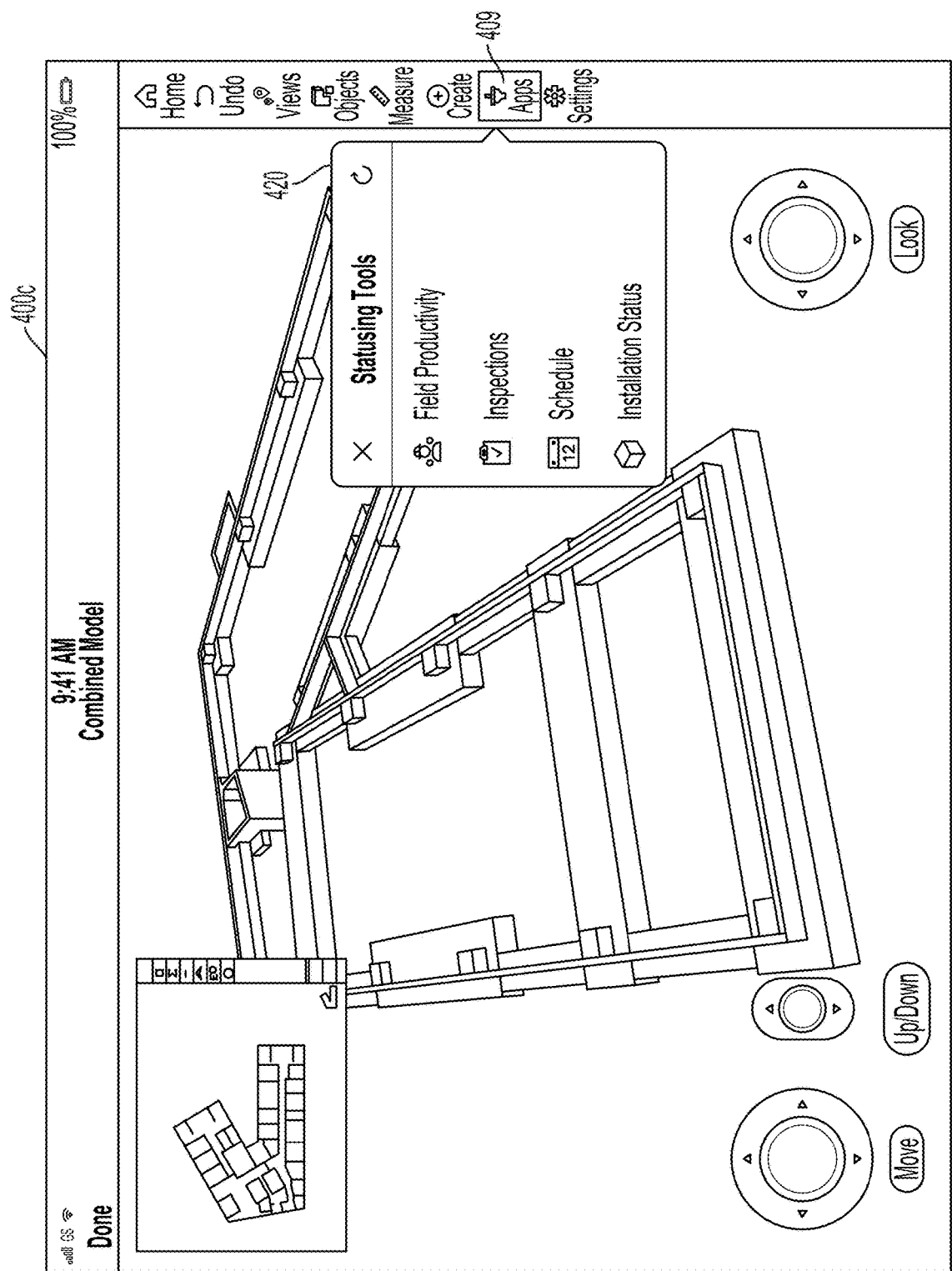
FIG. 4C depicts the three-dimensional model of FIG. 4A including a menu for selecting a statusing tool.

Turning to FIG. 4C, a snapshot 400c of the GUI depicted in FIG. 4A is shown, after a user has selected a control 409 for choosing a statusing tool. As shown in FIG. 4C, selecting the control 409 displays a menu 420 that includes the statusing tools to which the user has access, including the statusing tool discussed above for assigning an installation status for the building foundation.

Figure 4D:
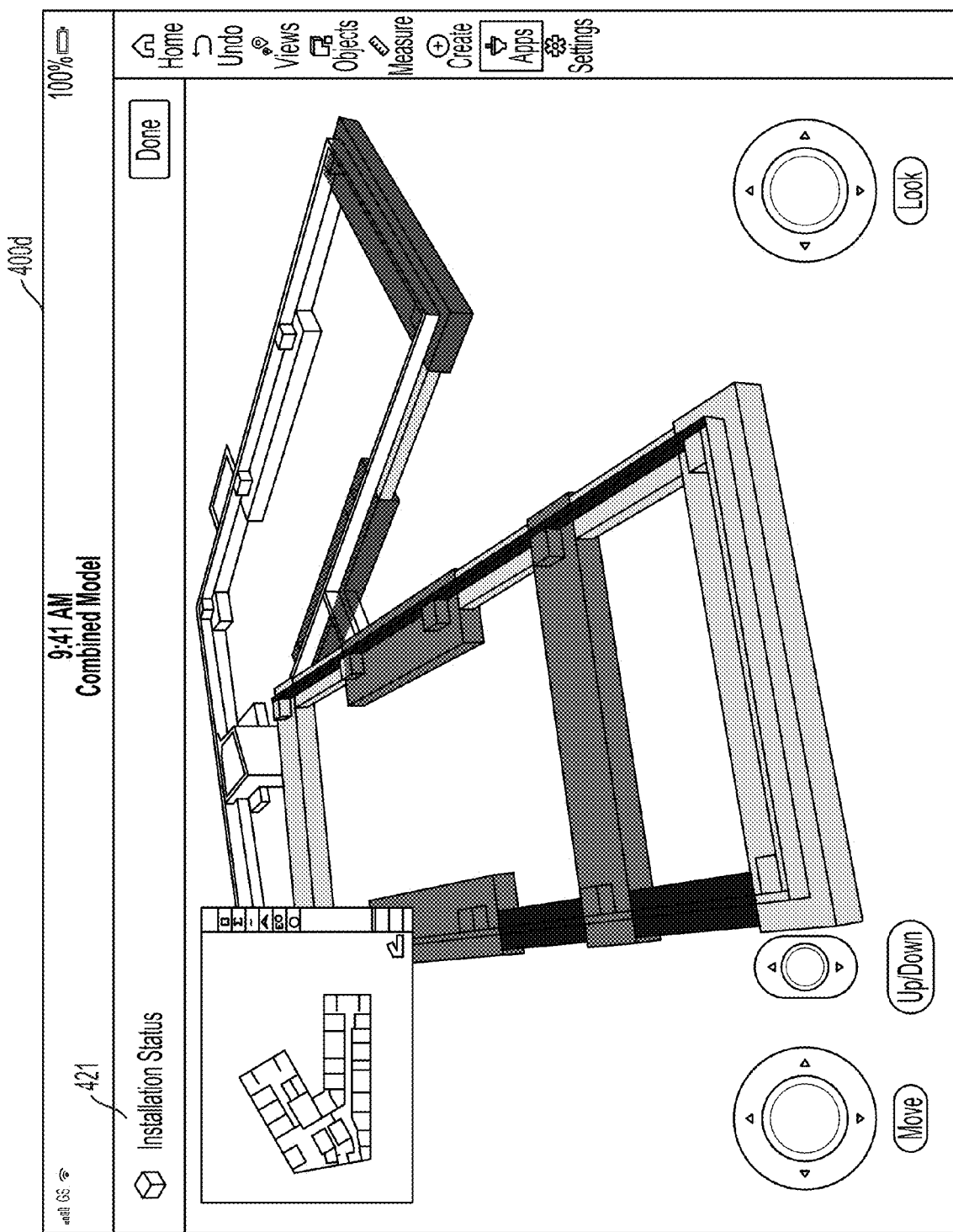
FIG. 4D depicts the three-dimensional model of FIG. 4C after selecting a statusing tool.

After the user selects the statusing tool for assigning an installation status for the building foundation, the GUI may be updated as shown in the snapshot 400d shown in FIG. 4D. For instance, the GUI may be updated with an indication of which statusing tool is currently in use, as shown by the banner 421 across the top of the screen. Other indications of the current statusing tool are also possible. In addition, the three-dimensional view of the model may be updated to reflect, for objects that have already been statused by the user (or by others), the display colors that were selected to correspond to each respective value in the set of values for the installation status. In this way, a user may be able to assess the installation status of the entire building foundation from a relatively brief visual inspection of the three-dimensional view.

Figure 4E:
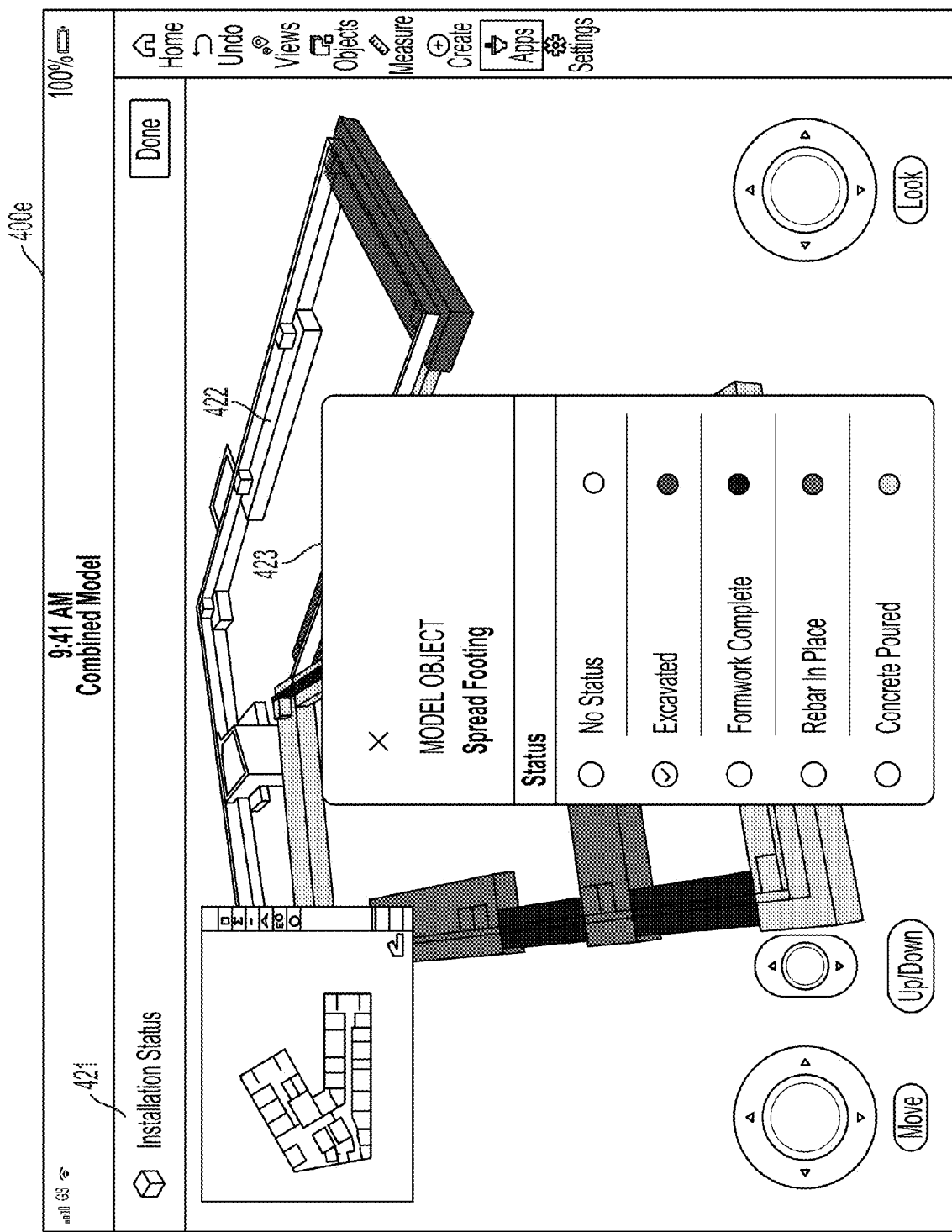
FIG. 4E depicts an example menu showing a list of values that a user may select to status an object in the three-dimensional model.

Turning to FIG. 4E, a snapshot 400e of the GUI depicted in FIG. 4D is shown, after a user has selected an object 422 within the three-dimensional view. As shown in FIG. 4E, a menu 423 is shown that identifies the object 422 as a spread footing and allows the user to assign a value to its installation status, which is currently set to the default value (with corresponding default display color) of "No Status." Using the menu 423, the user may select a value to update the status of the object 422 to reflect that the spread footing has been excavated.

Figure 4F:
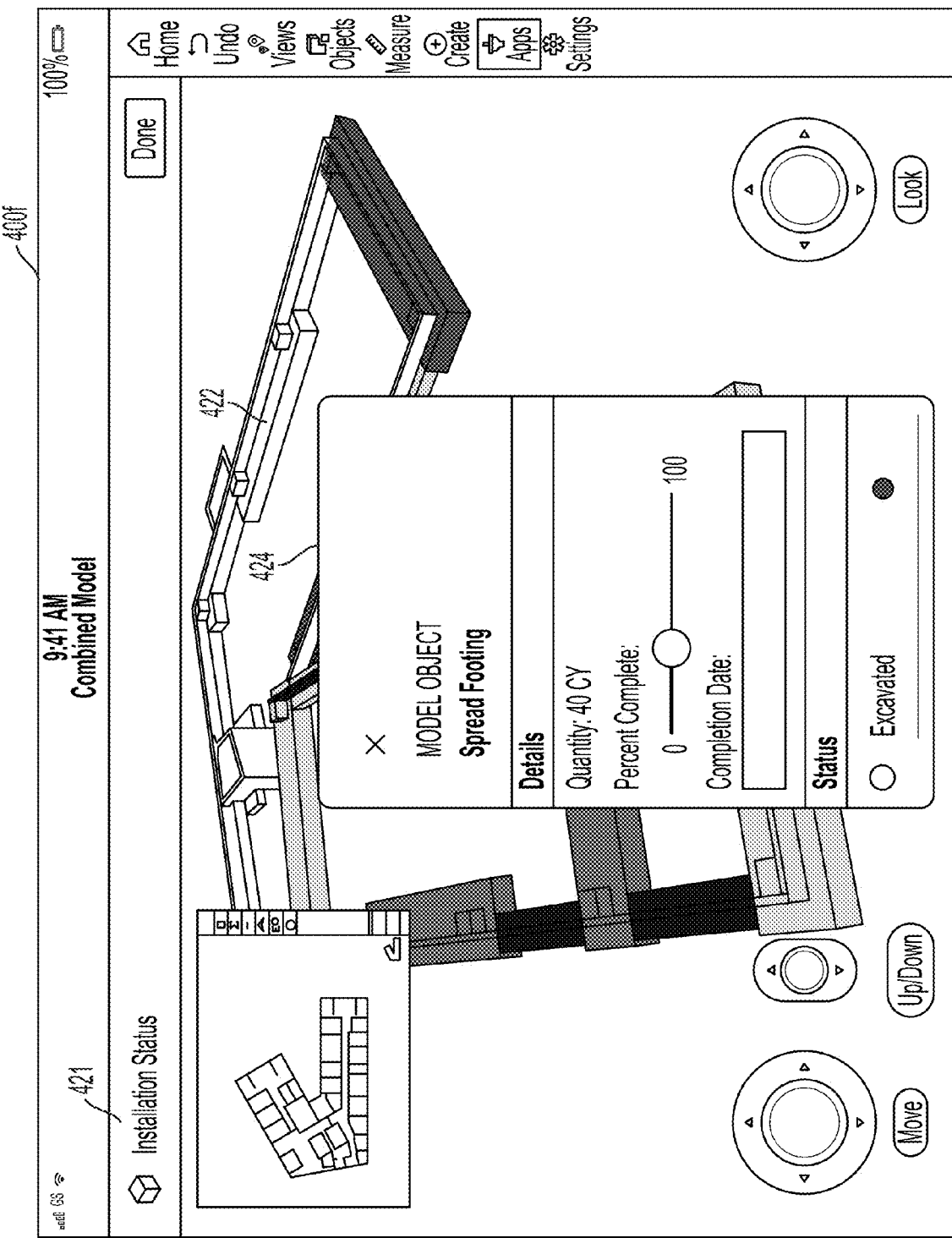
FIG. 4F depicts another example menu that a user may interact with to status an object in the three-dimensional model.

As noted above, a given statusing tool may be defined in various ways based on the needs and/or preferences of the construction professional. For example, FIG. 4F shows a snapshot 400f of the GUI depicted in FIG. 4E that includes an example of a different menu 424 that may be defined by the construction professional and used to status the object 422. As shown in FIG. 4F, the menu 424 indicates that the object 422 is a spread footing and requires an excavation that is quantified in cubic yards (CY). The menu 424 further includes a slider that the user can manipulate to indicate the percentage of the excavation that is complete. As the user moves the slider to the right, the quantity displayed in the menu 424 (e.g., 40 CY) may be updated. The menu 424 also includes a field for the user to enter a completion date for the excavation and a radio button for the user to select that the excavation step is complete. Other information may also be included in the menu 424, such as a timestamp corresponding to when each status update is made, which may be automatically populated but either the client station 112 or the computing platform 200.

In some implementations, the menu 424 shown in FIG. 4F may be included as a sub-menu of the menu 423 shown in FIG. 4E. For instance, when a user initially selects "Excavated" from the menu 423, the user may be presented with the more granular menu 424 for tracking the detailed status of the excavation step. Similar sub-menus may be provided for other steps in the foundation installation of as well.

Further, the client station 112 might be capable of receiving other inputs that might indicate a status of a given object in the model. For example, some building materials such as the building's structural steel beams may be tracked using RFID tags or similar technology (e.g., NFC tags, etc.) during transit and delivery to a construction site. When the steel beams are delivered to the construction site, a superintendent or other responsible party may scan the RFID tags to confirm delivery within a supply chain management application, among other possibilities. However, as noted above, it may also be convenient to, at the same time, update the federated model to reflect the status of the steel beams as delivered. Thus, the construction professional may define a statusing tool for the steel beams that receives uses an RFID tag scan by the client station 112 as input.

Figure 4G:
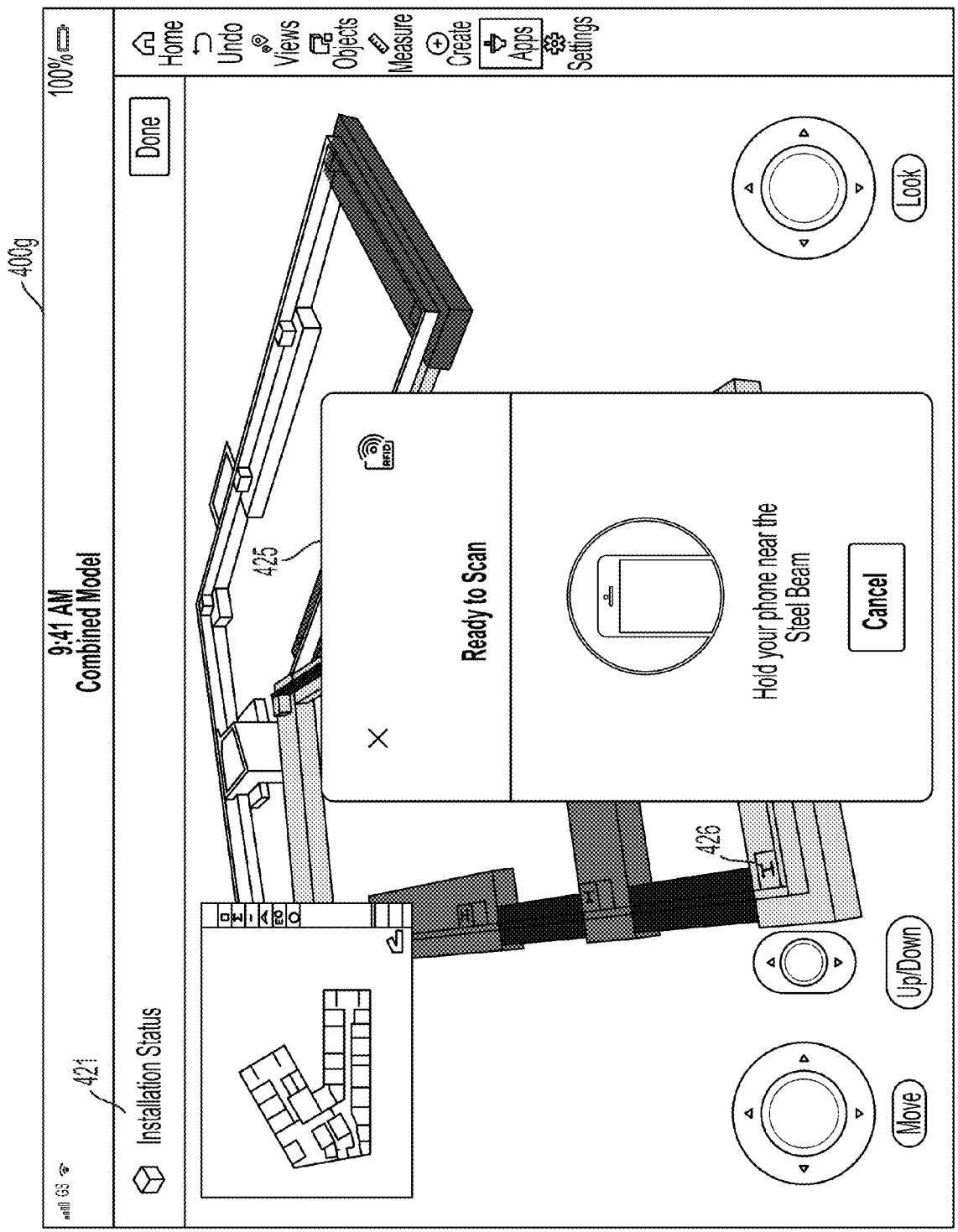
FIG. 4G depicts another example menu that indicates an action a user may take to status an object in the three-dimensional model.

Such an example is shown in FIG. 4G, which shows a snapshot 400g of the GUI depicted in FIGS. 4E-4F that includes an example of a different menu 425 that may be defined by the construction professional. As shown in FIG. 4G, the user may have selected an object 426 within the three-dimensional view that corresponds to a structural steel beam for the building. Rather than displaying a menu that prompts the user to select a value or enter information, the mobile viewer tool may display the menu 425, which prompts the user to hold the client station 112 (e.g., a smartphone) near the steel beam. Once the scan is complete, the status of the object 426 may be updated to reflect that it was delivered to the construction site.

Although several different examples of customized statusing tools are depicted in FIGS. 4B-4G, it should be understood that these are non-limiting examples, and numerous other variations and/or combinations are also possible.

Returning to the flow chart 300 shown in FIG. 3, at block 304, the computing platform 200 may receive, via the client station 112, one or more user inputs that collectively select the displayed representation of a given object within the model and assign a value for the property (e.g., the installation status) of the given object. For instance, one or more of the user inputs discussed above may be received at the client station 112 and then relayed to the computing platform 200.

At block 306, the computing platform 200 may identify a globally unique identifier (GUID) for the given object within the hierarchical data structure for the model. Once the GUID is identified, the computing platform 200 may update the model by associating the assigned value for the property with the GUID of the given object.

However, due to the federated nature of the three-dimensional model, identifying the GUID for a given object within the model may not be a straight-forward operation. This is because the location that a given object's GUID is saved within the hierarchical data structure for the model may depend on at least the authoring tool that was used to create the object, as well as a type of the given object. For example, within the three-dimensional federated model for the construction project, a wall that was created using a first authoring tool may have particular data structure including nodes that include object properties and other metadata for the wall. The wall's GUID may be saved in a particular location (e.g., within a particular node) within this particular data structure. On the other hand, a wall that was created using a second authoring tool may have a different data structure including a different set of nodes that arrange the object properties and metadata (e.g., the same object properties and metadata) differently, and thus the wall's GUID may be saved in a different location within the data structure of the second authoring tool. Further, these differing data structure arrangements are often not standardized before the component models created by different authoring tools are combined into the federated model. Instead, different portions of the hierarchical data structure for the federated model may be arranged differently, according to the underlying authoring tool that was used to create the respective portion of the federated model.

Figure 5A:
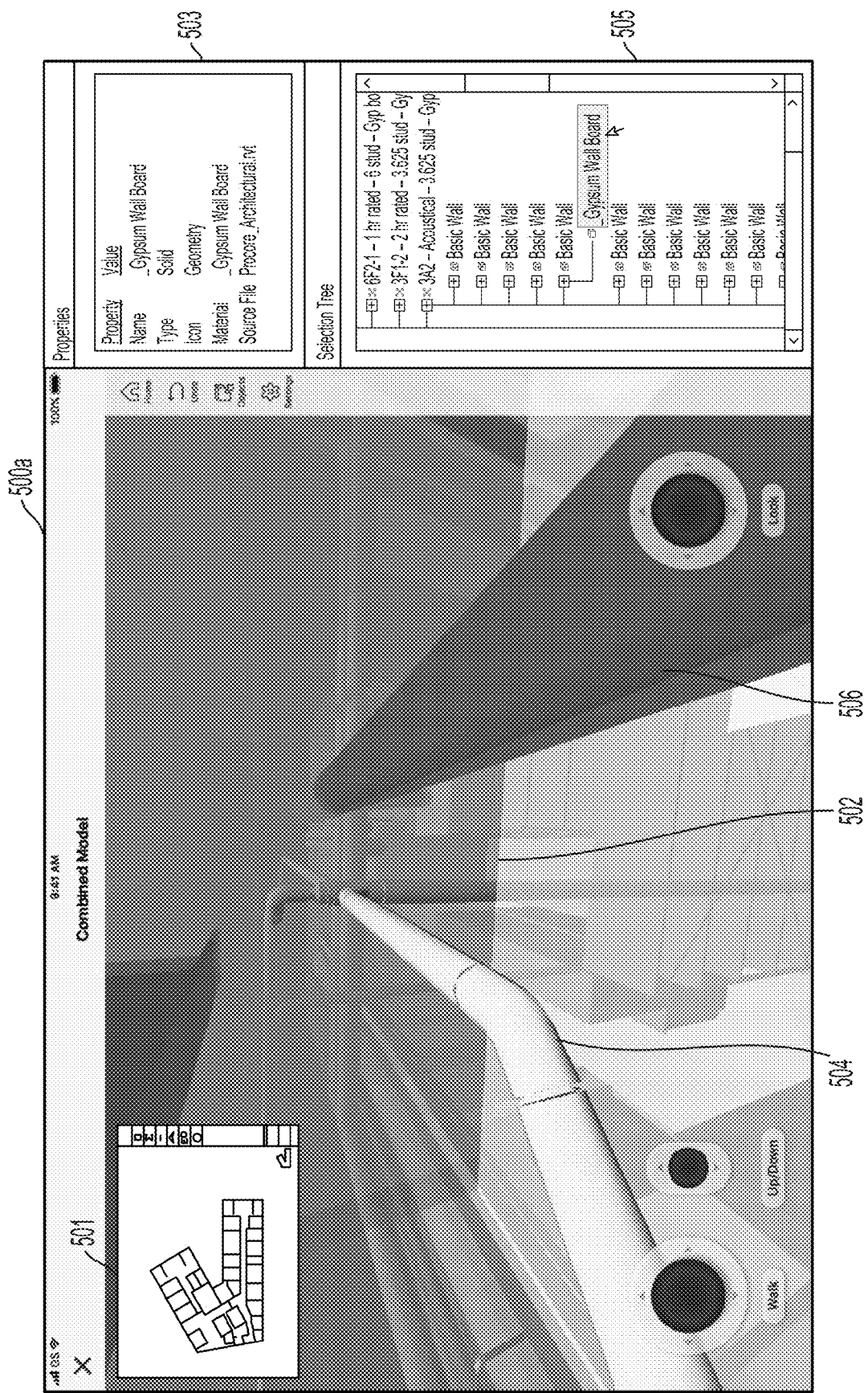
FIG. 5A depicts a selection of an object in an example mobile viewing tool and a corresponding representation of the selection at a first level of an example hierarchical data structure for the three-dimensional model.
Figure 5B:
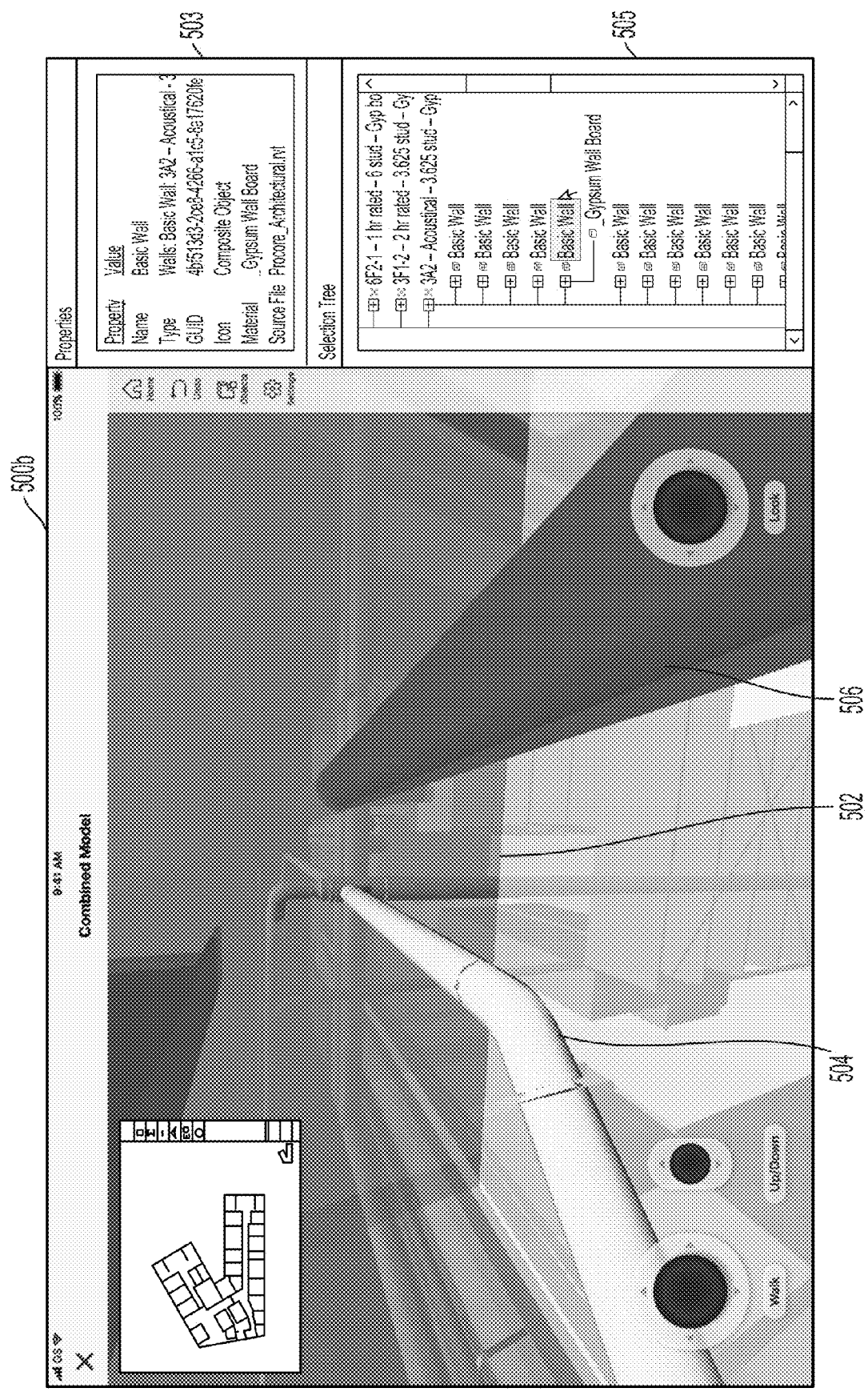
FIG. 5B depicts an example selection of the object of FIG. 5A at a second level of the hierarchical data structure.
Figure 5C:
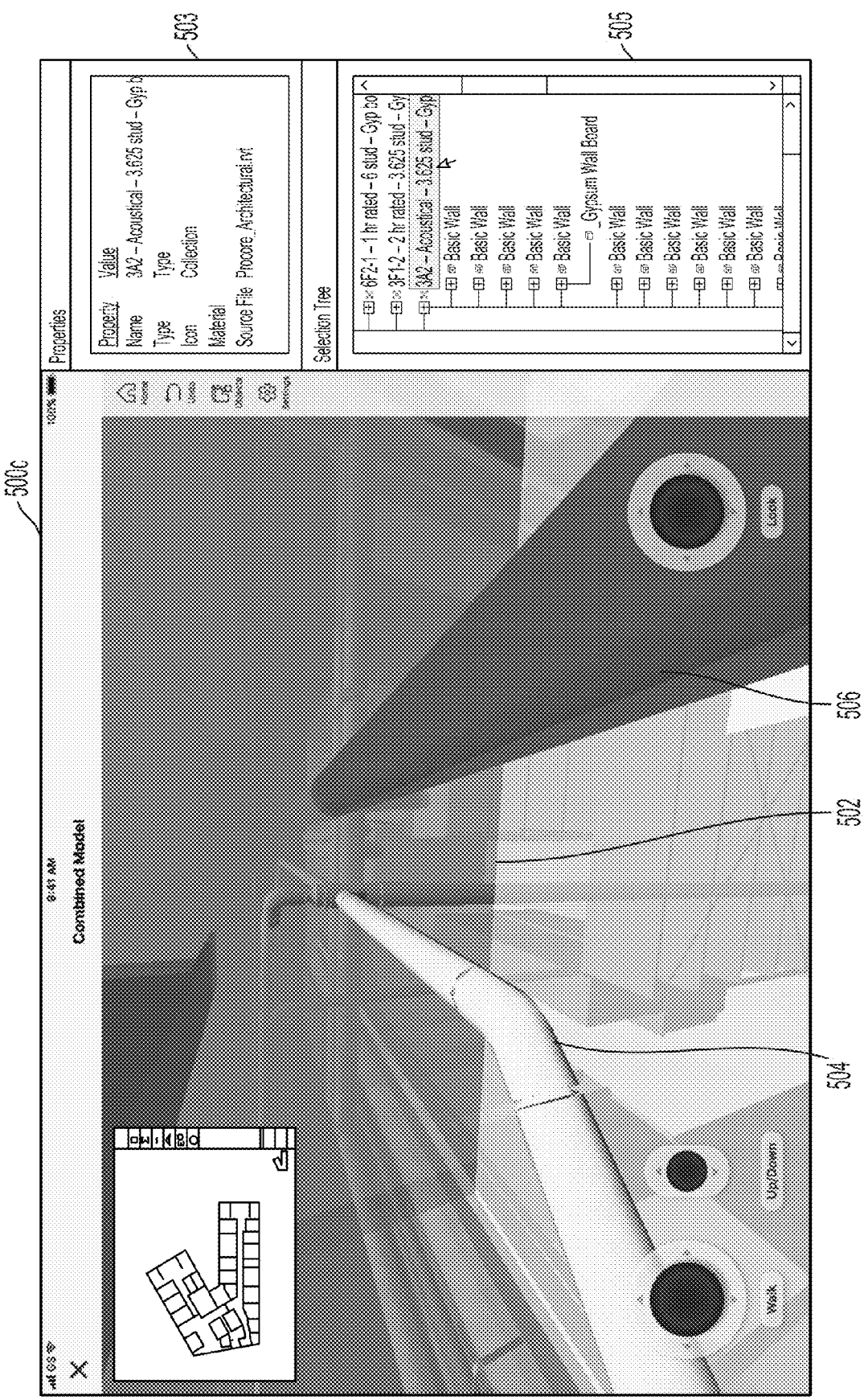
FIG. 5C depicts an example selection of the object of FIGS. 5A-5B at a third level of the hierarchical data structure.

Turning now to FIGS. 5A-5C, an example of a hierarchical data structure for a given object within a three-dimensional model is shown, which serves as a basis to illustrate the issue discussed above. FIG. 5A depicts an example snapshot 500a of a GUI that includes a three-dimensional view of the construction project shown in FIGS. 4A-4G, as indicated by the similar inset view 501. The snapshot 500a may be displayed by the client station 112 in communication with the computing platform 200, as discussed above. In FIG. 5A, a different area of the construction project is shown, including a mesh 502 representing an interior wall that is intersected by meshes 504 and 506, representing two pipes.

In FIG. 5A, a user has selected the mesh 502 representing the interior wall. In response to the user's selection, on the right side of the GUI, a first pane 503 is shown that lists the object properties and other metadata associated with the selection of the mesh 502. Further a second pane 505 is shown that visually displays a representation of the current level within the data structure for the wall, and thus, the overall hierarchical data structure for the model, that is being viewed.

As shown in the second pane 505 in FIG. 5A, the lowest level of the data structure for the wall, named "_Gypsum Wall Board" was selected by default when the user selected the mesh 502 within the three-dimensional view. This is because, for the particular authoring tool used to create the wall, the geometry information that defines the mesh 502 is located on this level of the data structure. This arrangement is reflected in the first pane 503, where the value of the property "Icon" is listed as "Geometry" for this node within the data structure. For some objects, created by some authoring tools, the object's GUID is also located within the same node of the data structure as the object's geometry. However, for the particular authoring tool used in the example shown in FIG. 5A, the GUID of the wall is not located on this level of the data structure.

Turning to FIG. 5B, a snapshot 500b of the GUI depicted in FIG. 5A is shown, in which the user has manually navigated within the second pane 505 to the next level up in the data structure, which is named "Basic Wall." As can be seen in the first pane 503, this level contains the GUID for the wall, which takes the form of a unique alpha-numeric character string.

Lastly, FIG. 5C shows a snapshot 500c of the GUI depicted in FIGS. 5A-5B, in which the user has manually navigated an additional level up in the data structure within the second pane 505. As can be seen in the first pane 503, this level of the data structure represents a collection node under which objects of the same type are grouped.

The example data structure shown in FIGS. 5A-5C demonstrates just one example of a data structure that may be used by a given authoring tool to define the object properties and other metadata associated with a given object. Numerous other arrangements for an object's data structure are also possible, depending on one or both of the type of object and the authoring tool that is used. For instance, the same authoring tool that was used to create the wall shown in FIGS. 5A-5C might organize the data structure for the pipes represented by meshes 504 and 506 in a different way. As one possibility, and unlike the GUID for the wall, the GUID for each of the pipes may be located within the same node as the geometry information that defines each mesh 504 and 506. As another possibility, the data structure for each pipe may include more (or fewer) nodes than the example data structure for the wall, and the GUID might alternatively be located within a lower node in the tree than the geometry information, or perhaps within a parallel node in the data structure. Moreover, a different authoring tool might organize the data structures for walls and/or pipes differently still.

Based on the discussion above, it will be appreciated that the location of the GUID for a given object within the federated model is unlikely to be uniform. As a result, when an input is received at block 306 to assign a value for a property of a given object, the computing platform 200 may undertake an identification of the GUID of the given object in various ways. In some implementations, the computing platform 200 may first identify the authoring tool that was used to create the given object. This information, perhaps in addition to the type of the given object, may provide an indication of where the GUID is located. For instance, a first authoring tool might store the GUID for all objects, or for a particular set of objects, within the same node as the geometry information for the object. Thus, once the computing platform 200 identifies the first authoring tool as the source of the given object, the location of the GUID may be determined and the GUID may be identified.

As another example, a second authoring tool might store the GUID for objects that are created using the second authoring tool at various different locations within the data structures for each object, with some GUIDs located within the same node as the object's geometry information while other GUIDs are located in a node separate from the object's geometry information. Nonetheless, the various different GUID locations may be consistent relative to a given reference node for each object. For instance, the second authoring tool may locate the GUID for all objects one level below a collection node for each object, whether or not that node also contains the object's geometry information. This arrangement is shown in the example of FIGS. 5A-5C, where the GUID for the wall is located one level below the collection node for "Basic Wall" objects, which is incidentally one level above the node containing each wall's geometry information. Accordingly, if the computing platform 200 identifies the second authoring tool as the source of a given object, the location of the GUID may be determined by locating the reference node (i.e., the collection node) within the data structure and then accessing the node one level below the reference node.

Various other examples for locating an object's GUID based on the authoring tool used to create the object and/or the type of object are also possible. In some cases, the conventions used by each authoring tool for determining the GUID locations and/or relative GUID locations for each object type may be saved by the computing platform 200 and used as a reference for identifying the GUID of a given object within the hierarchical data structure of the federated model, as discussed above.

The computing platform may determine the authoring tool that was used to create the given object in various ways. In some embodiments, the metadata for the given object at each level of the data structure may include an indication of the source file from which the given object originated. This can be seen in the first pane 503 in the example of FIGS. 5A-5C, where each level of the data structure includes an indication of the source file "Procore_Architecturalsvt." In this regard, the computing platform 200 may determine that the file extension ".rvt" indicates that the source file was created using Revit® as the authoring tool. The computing platform 200 may then use this information to determine the location of the GUID for the wall based on a known convention for data structure arrangements within Revit®. The computing platform 200 may determine the authoring tool that was used to create the given object in other ways as well.

In some other implementations, the computing platform 200 might not have access to information regarding GUID location conventions that are used by a particular authoring tool for a given object type. Further, in some instances, the GUID location for a given object might not conform to any predictable arrangement based on either the authoring tool or object type. In these situations, the computing platform 200 may search the data structure corresponding to the given object for the GUID. For example, the computing platform 200 may first search the node that is selected by default when a user selects a mesh within the three-dimensional model (e.g., the geometry layer) in order to determine whether the GUID is co-located with the geometry information. As one possibility, the computing platform 200 may search the node for a "Property" field named "GUID." As another possibility, the computing platform 200 may search the node for any "Value" having a syntax that matches an expected syntax for the GUID, which may generally conform to a particular alpha-numeric sequence, as shown in the example of FIG. 5B.

If the computing platform 200 determines that the GUID is not present in the initially-selected node, the computing platform 200 may systematically move up (and/or down) the nodes of the data structure and repeat the search until the location of the GUID is determined and the GUID for the given object is identified. Alternatively, the computing platform 200 may search all nodes within the given object's data structure simultaneously, or substantially simultaneously, to determine the location of the GUID. The location of the GUID may be determined in various other ways as well.

As noted above with respect to block 306 of the flow chart 300, once the GUID for a given object is identified, the computing platform 200 may update the model by associating the assigned value for the property with the GUID of the given object. The computing platform 200 may perform this operation in various ways. For instance, the computing platform 200 may use the information from a statusing tool as discussed above to create a custom property and corresponding value for the given object. This custom property and corresponding value may be added as a flag or similar data object on the same node as the GUID within the data structure, thereby associating the information with the GUID. For example, the installation status value of "Excavated" that is entered by the user in menu 423 of FIG. 4E may result in the computing platform 200 adding this information to a custom "Installation Status" property field that is created within the data structure for the spread footing, on the same node as the spread footing's GUID. In this way, the computing platform may update the model to reflect the assigned value for the given object.

At block 308, the computing platform 200 may cause the client station 112 to display the updated model including an indication of the assigned value for the property of the given object. The indication of the assigned value may be displayed in the model in various ways. As one example, objects within a three-dimensional view may be displayed in a particular color reflecting the assigned value when the corresponding statusing tool is selected. This can be seen by way of example in FIGS. 4D-4G, in which the three-dimensional view of the model has been updated to reflect the installation status of objects that have been updated by the user (or by others). In particular, each object is displayed in a particular color that was selected to correspond to a respective installation status value. As another example, an indication of the assigned value may be viewable in an information pane that displays an object's properties and other metadata, such as the first pane 503 shown in FIG. 5B. For instance, based on the statusing tool created by the construction professional (e.g., at FIG. 4B) and the information entered into the tool by a suer (e.g., at FIG. 4E), an additional "Installation Status" property field may be added to data structure for the spread footing, with the assigned value of "Excavated." The indication of the assigned value may be displayed in other ways as well.

In addition to the benefits discussed above related to the visualization and tracking of status information during the construction phase, the ability to quickly and easily status objects in the field via a mobile viewing tool may facilitate additional downstream functionality as well. For example, the installation status information discussed above that is provided by a user and used by the computing platform 200 to update the model may also be used by the computing platform 200 to perform advanced analytics (e.g., predictive analytics) and/or automate certain operations that might otherwise depend on manual data entry by a user to be completed.

Figure 6:
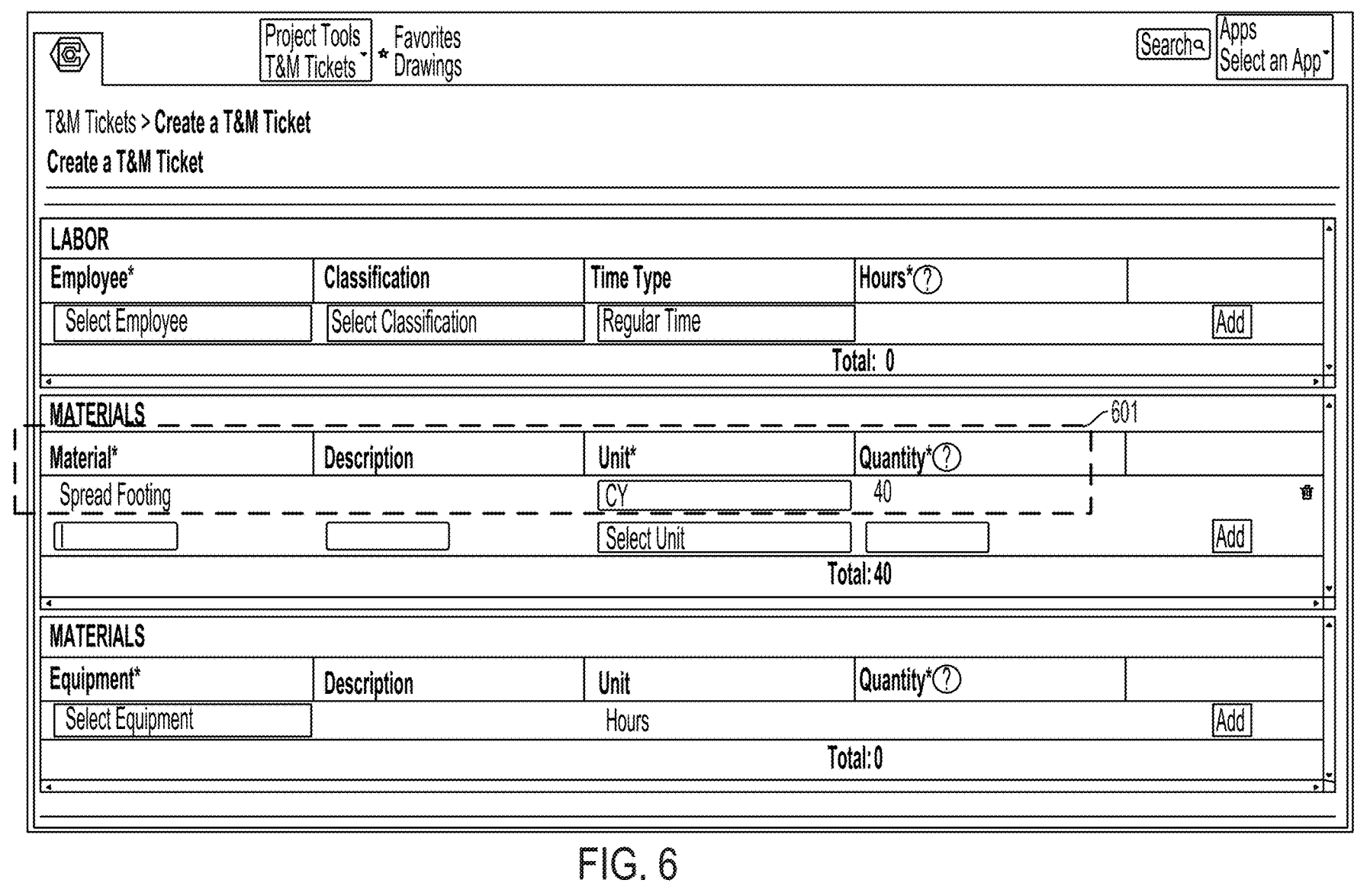

FIG. 6 illustrates one example of an operation that may be at least partially automated using the status information that in input by a user as discussed above. FIG. 6 illustrates a snapshot 600 of a GUI for generating an invoice that is based on (i) the time spent to perform a given task (e.g., employee hours and optionally, equipment hours) and (ii) the quantity of material installed and/or completed. This type of invoice is also known as a T&M ticket, which may be generated using a T&M ticketing tool of the type shown in FIG. 6. Traditionally, a user may be required to manually enter some or all of the information used to create a T&M ticket, perhaps after compiling such information from other users who were responsible for the installation of the given materials.

However, using the information that was added to the model using the statusing tool discussed above, the computing platform 200 may automatically populate certain fields within the T&M ticket. For instance, referring to the statusing tool menu 424 shown in FIG. 4F by way of example, the computing platform 200 may automatically populate the material, unit, and quantity fields within the Materials portion of the T&M ticketing tool to indicate that 40 CY of a spread footing were installed, as indicated by the dashed box 601. Consequently, a user does not need to track down this information, and moreover, does not need to enter the information into the T&M ticketing tool. Other types of invoices may be generated or partially generated in a similar way based on object status information that is added to the model.

In a similar way, the computing platform 200 might automatically update a project schedule or a project budget based on various object statuses that are entered by users of the statusing tools discussed above. Numerous other examples are also possible.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

The invention claimed is:
1. A client device comprising:
a network interface;
at least one processor;
non-transitory computer-readable medium; and
program instructions stored on the non-transitory computer-readable medium that are executable by the at least one processor such that the client device is configured to:
 display, via a viewing tool installed on the client device, a representation of a three-dimensional, federated model of a construction project, wherein the model comprises respective objects created using at least two different authoring tools;
 receive one or more user inputs that collectively (i) select a displayed representation of a given object within the model and (ii) assign a value for a property of the given object;
 based on the one or more user inputs:
  identify a globally unique identifier (GUID) that uniquely identifies the given object within a hierarchical data structure for the model; and
  cause the model to be updated by associating the assigned value for the property with the GUID that uniquely identifies the given object; and display, via the viewing tool, a representation of the updated model comprising an indication of the assigned value for the property of the given object.

2. The client device of claim 1, wherein the client device is a mobile device, and wherein the viewing tool for displaying the model is a plug-in configured to operate as a component of another application installed on the mobile device.

3. The client device of claim 1, wherein the one or more user inputs comprise one or more second user inputs, the client device further comprising program instructions stored on the non-transitory computer-readable medium that are executable by the at least one processor such that the client device is configured to:
   display, via the viewing tool, an interface for receiving one or more first user inputs that define (i) one or more properties of the given object and (ii) a respective set of possible values for each of the one or more properties; and
   before receiving the one or more second user inputs, receive, via the viewing tool, one or more first user inputs that define (i) the property of the given object and (ii) a set of possible values for the property, wherein the set of possible values comprises the assigned value.

4. The client device of claim 3, wherein the program instructions that are executable by the at least one processor such that the client device is configured to define the respective set of possible values for each of the one or more properties comprise program instructions that are executable by the at least one processor such that the client device is configured to designate a respective display color corresponding to each value in a respective set of values; and
   wherein the program instructions that are executable by the at least one processor such that the client device is configured to display, via the viewing tool, the representation of the updated model comprise program instructions that are executable by the at least one processor such that the client device is configured to display, via the viewing tool, the representation of the updated model such that the given object is displayed in the designated display color corresponding to the assigned value.

5. The client device of claim 1, wherein the program instructions that are executable by the at least one processor such that the client device is configured to identify the GUID comprise program instructions that are executable by the at least one processor such that the client device is configured to:
   identify an authoring tool that was used to create the given object in the model; and
   based on the identified authoring tool, determine a location within the hierarchical data structure where the GUID is saved.

6. The client device of claim 1, wherein the property of the given object reflects an installation status of construction materials corresponding to the given object in the model.

7. The client device of claim 6, further comprising program instructions stored on the non-transitory computer-readable medium that are executable by the at least one processor such that the client device is configured to:
   based on the assigned value for the property of the given object indicating the installation status, cause an invoice corresponding to the installation status of the construction materials to be generated.

8. The client device of claim 1, wherein the three-dimensional, federated model of the construction project is maintained by a cloud-based computing platform, and wherein program instructions that are executable by the at least one processor such that the client device is configured to display the representation of the three-dimensional, federated model of the construction project comprise program instructions that are executable by the at least one processor such that the client device is configured to access the three-dimensional, federated model of the construction project maintained by the cloud-based computing platform.

9. A non-transitory computer-readable medium, wherein the non-transitory computer-readable medium is provisioned with program instructions that, when executed by at least one processor, cause a client device to:
   display, via a viewing tool installed on the client device, a representation of a three-dimensional, federated model of a construction project, wherein the model comprises respective objects created using at least two different authoring tools;
   receive one or more user inputs that collectively (i) select a displayed representation of a given object within the model and (ii) assign a value for a property of the given object;
   based on the one or more user inputs:
      identify a globally unique identifier (GUID) that uniquely identifies the given object within a hierarchical data structure for the model; and
      cause the model to be updated by associating the assigned value for the property with the GUID that uniquely identifies the given object; and
   display, via the viewing tool, a representation of the updated model comprising an indication of the assigned value for the property of the given object.

10. The non-transitory computer-readable medium of claim 9, wherein the client device is a mobile device, and wherein the viewing tool for displaying the model is a plug-in configured to operate as a component of another application installed on the mobile device.

11. The non-transitory computer-readable medium of claim 9, wherein the one or more user inputs comprise one or more second user inputs, and wherein the non-transitory computer-readable medium is also provisioned with program instructions that, when executed by at least one processor, cause the client device to:
   display, via the viewing tool, an interface for receiving one or more first user inputs that define (i) one or more properties of the given object and (ii) a respective set of possible values for each of the one or more properties; and
   before receiving the one or more second user inputs, receive, via the viewing tool, one or more first user inputs that define (i) the property of the given object and (ii) a set of possible values for the property, wherein the set of possible values comprises the assigned value.

12. The non-transitory computer-readable medium of claim 11, wherein the program instructions that, when executed by at least one processor, cause the client device to define the respective set of possible values for each of the one or more properties comprise program instructions that, when executed by at least one processor, cause the client device to designate a respective display color corresponding to each value in a respective set of values; and
   wherein the program instructions that, when executed by at least one processor, cause the client device to display, via the viewing tool, the representation of the updated model comprise program instructions that, when executed by at least one processor, cause the client device to display, via the viewing tool, the representation of the updated model such that the given object is displayed in the designated display color corresponding to the assigned value.

13. The non-transitory computer-readable medium of claim 9, wherein the program instructions that, when executed by at least one processor, cause the client device to identify the GUID comprise program instructions that, when executed by at least one processor, cause the client device to:
identify an authoring tool that was used to create the given object in the model; and
based on the identified authoring tool, determine a location within the hierarchical data structure where the GUID is saved.

14. The non-transitory computer-readable medium of claim 9, wherein the property of the given object reflects an installation status of construction materials corresponding to the given object in the model.

15. The non-transitory computer-readable medium of claim 14, wherein the at least one non-transitory computer-readable medium is provisioned with program instructions that, when executed by at least one processor, cause a client device to:
based on the assigned value for the property of the given object indicating the installation status, cause an invoice corresponding to the installation status of the construction materials to be generated.

16. The non-transitory computer-readable medium of claim 9, wherein the three-dimensional, federated model of the construction project is maintained by a cloud-based computing platform, and wherein program instructions that, when executed by at least one processor, cause the client device to display the representation of the three-dimensional, federated model of the construction project comprise program instructions that, when executed by at least one processor, cause the client device to access the three-dimensional, federated model of the construction project maintained by the cloud-based computing platform.

17. A method carried out by a client device, the method comprising:
displaying, via a viewing tool installed on the client device, a representation of a three-dimensional, federated model of a construction project, wherein the model comprises respective objects created using at least two different authoring tools;
receiving one or more user inputs that collectively (i) select a displayed representation of a given object within the model and (ii) assign a value for a property of the given object;
based on the one or more user inputs:
identifying a globally unique identifier (GUID) that uniquely identifies the given object within a hierarchical data structure for the model; and
causing the model to be updated by associating the assigned value for the property with the GUID that uniquely identifies the given object; and
displaying, via the viewing tool, a representation of the updated model comprising an indication of the assigned value for the property of the given object.

18. The method of claim 17, wherein the client device is a mobile device, and wherein the viewing tool for displaying the model is a plug-in configured to operate as a component of another application installed on the mobile device.

19. The method of claim 17, wherein to identifying the GUID comprises:
identifying an authoring tool that was used to create the given object in the model; and
based on the identified authoring tool, determining a location within the hierarchical data structure where the GUID is saved.

20. The method of claim 17, wherein the three-dimensional, federated model of the construction project is maintained by a cloud-based computing platform, and wherein displaying the representation of the three-dimensional, federated model of the construction project comprises accessing the three-dimensional, federated model of the construction project maintained by the cloud-based computing platform.

* * * * *